(12) United States Patent
Maruyama et al.

(10) Patent No.: US 10,011,097 B2
(45) Date of Patent: Jul. 3, 2018

(54) SUN-BLOCKING MULTILAYERED SHEET AND HAND-HELD PARASOL, TENT, TARP, HOOD, HAT, AND FIXED PARASOL COMPRISING SAID SUN-BLOCKING MULTILAYERED SHEET

(71) Applicants: TORAY INDUSTRIES, INC., Tokyo (JP); TEC ONE CO., LTD., Nomi-shi, Ishikawa (JP)

(72) Inventors: Mitsuru Maruyama, Tokyo (JP); Tatsuro Hasegawa, Tokyo (JP); Hiroto Nomura, Nomi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 176 days.

(21) Appl. No.: 14/889,528

(22) PCT Filed: May 14, 2014

(86) PCT No.: PCT/JP2014/062782
§ 371 (c)(1),
(2) Date: Nov. 6, 2015

(87) PCT Pub. No.: WO2014/185440
PCT Pub. Date: Nov. 20, 2014

(65) Prior Publication Data
US 2016/0096348 A1    Apr. 7, 2016

(30) Foreign Application Priority Data

May 16, 2013   (JP) .................................. 2013-103852

(51) Int. Cl.
*B32B 27/20* (2006.01)
*B32B 5/24* (2006.01)
(Continued)

(52) U.S. Cl.
CPC ................ *B32B 27/20* (2013.01); *A42B 1/04* (2013.01); *A45B 25/18* (2013.01); *B32B 5/024* (2013.01);
(Continued)

(58) Field of Classification Search
None
See application file for complete search history.

(56) References Cited

U.S. PATENT DOCUMENTS

| 8,339,700 B2 * | 12/2012 | Watanabe | ................. B32B 7/02 136/246 |
| 2007/0021020 A1 * | 1/2007 | Pinton | .................... D06M 11/46 442/59 |
| 2009/0268278 A1 * | 10/2009 | Suzuki | .................... B32B 27/20 359/359 |

FOREIGN PATENT DOCUMENTS

| JP | 2007-325757 A | 12/2007 |
| JP | 2008-115488 A | 5/2008 |

(Continued)

*Primary Examiner* — Arti Singh-Pandey
(74) *Attorney, Agent, or Firm* — Birch, Stewart, Kolasch & Birch, LLP

(57) ABSTRACT

This invention addresses the problem of eliminating the shortcomings of existing sun-blocking materials and providing a sun-blocking multilayered sheet that is highly suitable as a sun-blocking material that exhibits excellent light-blocking effect and an excellent cooling effect. In order to solve said problem, this invention provides a sun-blocking multilayered sheet that comprises at least one layer of synthetic resin film and at least one layer of textile, said synthetic resin film containing between 10% and 70% titanium oxide by mass, inclusive. A textile comprising synthetic fibers that contain between 0.1% and 10% titanium oxide by mass, inclusive, may be used as the aforementioned textile.

10 Claims, 1 Drawing Sheet

(51) Int. Cl.
  *B32B 27/12*   (2006.01)
  *B32B 27/18*   (2006.01)
  *B62B 9/14*    (2006.01)
  *E04H 15/54*   (2006.01)
  *A45B 25/18*   (2006.01)
  *A42B 1/04*    (2006.01)
  *B32B 5/02*    (2006.01)
  *B32B 27/40*   (2006.01)
  *B32B 7/12*    (2006.01)
  *B32B 25/08*   (2006.01)
  *B32B 25/10*   (2006.01)
  *B32B 25/12*   (2006.01)
  *B32B 25/14*   (2006.01)
  *B32B 25/16*   (2006.01)
  *B32B 25/18*   (2006.01)
  *B32B 25/20*   (2006.01)
  *B32B 27/08*   (2006.01)
  *B32B 27/30*   (2006.01)
  *B32B 27/32*   (2006.01)
  *A42B 1/00*    (2006.01)

(52) U.S. Cl.
  CPC ............... *B32B 5/026* (2013.01); *B32B 5/24* (2013.01); *B32B 7/12* (2013.01); *B32B 25/08* (2013.01); *B32B 25/10* (2013.01); *B32B 25/12* (2013.01); *B32B 25/14* (2013.01); *B32B 25/16* (2013.01); *B32B 25/18* (2013.01); *B32B 25/20* (2013.01); *B32B 27/08* (2013.01); *B32B 27/12* (2013.01); *B32B 27/18* (2013.01); *B32B 27/304* (2013.01); *B32B 27/32* (2013.01); *B32B 27/40* (2013.01); *B62B 9/14* (2013.01); *E04H 15/54* (2013.01); *A42B 1/00* (2013.01); *A45B 2025/183* (2013.01); *B32B 2262/0261* (2013.01); *B32B 2262/0276* (2013.01); *B32B 2262/0284* (2013.01); *B32B 2264/102* (2013.01); *B32B 2264/105* (2013.01); *B32B 2264/108* (2013.01); *B32B 2274/00* (2013.01); *B32B 2307/40* (2013.01); *B32B 2307/41* (2013.01); *B32B 2307/71* (2013.01); *B32B 2437/04* (2013.01); *B32B 2571/00* (2013.01)

(56) References Cited

FOREIGN PATENT DOCUMENTS

| | | |
|---|---|---|
| JP | 2011-56072 A | 3/2011 |
| JP | 3176928 U | 7/2012 |

\* cited by examiner

SUN-BLOCKING MULTILAYERED SHEET AND HAND-HELD PARASOL, TENT, TARP, HOOD, HAT, AND FIXED PARASOL COMPRISING SAID SUN-BLOCKING MULTILAYERED SHEET

TECHNICAL FIELD OF THE INVENTION

Our invention relates to a sun-blocking multilayered sheet excellent in sunlight blocking suitably used as hand-held parasol, tent or the like.

BACKGROUND ART OF THE INVENTION

Recently, global warming and ozone depletion have caused problems such as increasing heat attack in hot summer, harmful ultraviolet rays (UV-B) in the sunlight influencing ecosystem, skin cancer and declined immunity function influencing human bodies. To solve the problems, sun-blocking materials for hand-held parasol, tent or the like are increasingly demanded to improve in light-blocking effect and cooling effect.

Conventional hand-held parasols made of a high density woven textile dyed black cannot sufficiently block ultraviolet rays, visible rays and infrared rays in the sunlight.

Accordingly, some parasol cloths are coated with a resin containing functional material such as titanium oxide and black pigment having a blocking function of ultraviolet rays and heat, as disclosed in Patent documents 1 and 2. Patent document 3 suggests that the back side of parasol cloth should be dark-colored so that incident light is absorbed on the back side of parasols after the transmitted sunlight reflects on the surface of the earth. Patent document 4 suggests that the inner depressed part of hand-held parasol should be made of a black cloth so that visible rays and ultraviolet rays are blocked by 100%.

Further, tents are generally made of a sheet such as rubberized cloth and vinyl tarpaulin.

PRIOR ART DOCUMENTS

Patent Documents

Patent document 1: JP2007-325757-A
Patent document 2: JP2008-115488-A
Patent document 3: JP2011-56072-A
Patent document 4: JP3176928-U

SUMMARY OF THE INVENTION

Problems to be Solved by the Invention

The coating material disclosed in Patent document 1 or 2 is required to contain additives adjusted to a level enough to keep coating characteristics of resin and cannot be made thick, so that ultraviolet rays and infrared rays are not cut off entirely. Also sufficient cooling effect cannot be achieved.

Even when the back side is dark-colored as disclosed in Patent document 3, ultraviolet rays and infrared rays cannot be cut off entirely to achieve sufficient cooling effect. Further, Patent document 4 doesn't disclose details of configuration and means of the hand-held parasol to block visible rays and ultraviolet rays in the sunlight by 100%. It may be difficult that the sunlight is blocked by 100% substantively with a cloth only.

Furthermore, a conventional material for tents has a poor light-blocking effect and is demanded to improve in light-blocking effect like parasol cloths.

Against such a problem derived from recent hot summer, although sun-blocking materials for hand-held parasol and tent are increasingly required to have excellent light-blocking effect and cooling effect derived from the light-blocking effect, there has been no good material to solve the problem substantively.

Accordingly, it could be helpful to provide a sun-blocking multilayered sheet that is suitable for sun-blocking material with excellent in cooling effect as well as light-blocking effect.

Means for Solving the Problems

To achieve the above-described object, our sun-blocking multilayered sheet is a sun-blocking multilayered sheet comprising at least one layer of a synthetic resin film and at least one layer of a textile, characterized in that the synthetic resin film contains a titanium oxide of 10 mass % or more and 70 mass % or less.

In the sun-blocking multilayered sheet, it is preferable that the synthetic resin film comprises one face of the textile, a middle layer of the synthetic resin film and the other face of another synthetic resin film containing a carbon black.

In the sun-blocking multilayered sheet, it is preferable that said another synthetic resin film contains the carbon black of 5 mass % or more and 40 mass % or less.

In the sun-blocking multilayered sheet, it is preferable that the textile comprises a synthetic fiber containing a titanium oxide of 1 mass % or more and 10 mass % or less.

In the sun-blocking multilayered sheet, it is preferable that the textile comprises a woven fabric having 1,300 or more and 2,800 or less of a cover factor defined by a formula:

Cover factor $A \times D_A^{1/2} + B \times D_B^{1/2}$, where

A: Warp yarn density of woven fabric [pieces/2.54 cm]
B: Weft yarn density of woven fabric [pieces/2.54 cm]
$D_A$: Warp yarn total fineness [dtex]
$D_B$: Weft yarn total fineness [dtex].

Our sun-blocking multilayered sheet is excellent in sunlight-blocking effect and cooling effect, and is applicable for sun-blocking goods such as parasol, tent, tarp, hood such as stroller hood and vehicle hood, hat and parasol.

Effect According to the Invention

Our invention provides a sun-blocking multilayered sheet excellent in sunlight-blocking effect as well as cooling effect derived from the light-blocking effect.

Our sun-blocking multilayered sheet achieves excellent light-blocking effect with synthetic resin film containing titanium oxide of a high proportion. The sheet can be layered with textile to improve utility and physical properties to prevent breakage. The sunlight-blocking effect can be further improved by using a high-density woven fabric or knitted fabric containing titanium oxide. When a back side is made of a synthetic resin film containing carbon black, the sunlight can be further blocked while light coming from the bottom side as reflecting a road surface or the like can be absorbed, so that the sun-blocking multilayered sheet is provided with excellent light-blocking effect and cooling effect never achieved conventionally.

EMBODIMENTS FOR CARRYING OUT THE INVENTION

It is necessary for our sun-blocking multilayered sheet to comprise at least one layer of a synthetic resin film and at least one layer of textile, the synthetic resin film containing titanium oxide of 10 mass % to 70 mass %.

Figure 1:
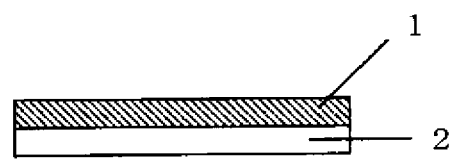
FIG. 1 is a cross section view of a sun-blocking multilayered sheet according to an example of the present invention.

FIG. 1 is a cross section view of a sun-blocking multi-layered sheet according to an example of the present invention. FIG. 1 shows a laminated integrated sun-blocking multilayered sheet consisting of textile 1 and synthetic resin film 2 excellent in light-blocking effect containing titanium oxide by 10 mass % to 70 mass %.

The synthetic resin film may be made of a rubber selected from natural rubber, isoprene rubber, butadiene rubber, styrene butadiene rubber, isobutylene-isoprene rubber, ethylene-propylene rubber, ethylene-vinyl acetate copolymer, chloroprene rubber, chlorosulfonated polyethylene, chlorination polyethylene, epichlorohydrin rubber, nitrile rubber, nitrile isoprene rubber, acrylic rubber, urethane rubber, polysulfide rubber, silicone rubber and fluorine rubber, or be made of vinyl chloride-based resin, polyurethane resin, polyolefin-based resin, thermoplastic elastomer or the like.

As needed, the synthetic resin may contain an additive such as vulcanization auxiliary agent, vulcanization accelerant, anti-aging agent, filler, processing auxiliary agent, softener, antistatic agent, plasticizer, stabilizer, antioxidant and coloring agent.

The synthetic resin contains titanium oxide by 10 mass % to 70 mass %. The content of less than 10 mass % might have an insufficient light-blocking effect while the content of more than 70 mass % might deteriorate the film formability or appearance quality as causing a problem of physical properties such as film breakage. It is preferable that the content is 15 mass % or more and 60 mass % or less. It is preferably 20 mass % or more and 50 mass % or less.

It is possible that the synthetic resin contains fine particles of metal such as aluminium having sunlight-blocking effect or alumina, other than titanium oxide.

The thickness of the synthetic resin film can be adjusted according to intended purposes. It is generally preferable that the thickness is 15 to 200 μm, preferably 50 to 150 μm. Excessive thickness might increase the production cost and the mass of synthetic resin film in itself and the whole sun-blocking multilayered sheet while insufficient thickness might have insufficient light-blocking effect.

The sun-blocking multilayered sheet comprises a synthetic resin film laminated with a textile, in case that the synthetic resin film might be caught to break in use and might cause a problem of distorted fabric due to elongation in repetitive use.

The textile may be made of a natural fiber such as cotton and silk or a regenerated fiber such as rayon, or may be a textile made by weaving or knitting a synthetic multifilament fiber. It is preferable that the textile is made from the synthetic multifilament fiber excellent in durability and processability.

It is preferable that the synthetic multifilament is a polyamide-based fiber such as nylon 6 and nylon 66, a polyester-based fiber such as polyethylene terephthalate, polytrimethylene terephthalate and polybutylene terephthalate, a biodegradable fiber such as polylactic acid fiber or the like.

The filament unit may have a cross section of circle, triangle, octofoil, flat, or may have a modified cross-section of Y shape or the like. It is possible to employ a composite yarn of core-sheath type or side-by-side type comprising different kinds of polymers having different viscosities or the like.

To improve a light-blocking effect, it is preferable to employ a titanium oxide-containing synthetic fiber. It is preferable that it contains titanium oxide of 0.1 mass % or more and 10 mass % or less. The content of more than 10% might deteriorate spinnability or quality with streaks or the like. The content is preferably 1.0 mass % or more and 8 mass % or less. In addition to titanium oxide, it is possible that the synthetic fiber contains metal particles of aluminium or its compound such as alumina and zinc oxide for improving the light-blocking effect.

It is preferable to employ a false-twisted textured yarn. The false-twisted textured yarn can be woven or knitted in a high density, so that the false-twisted textured yarn is crimped to improve the light-blocking effect.

It is possible to design a yarn fineness (total fineness) according to each purpose so that the textile has an appropriate unit weight (weight per square meter). For example, it is preferable that a parasol cloth has a fineness of 20 dtex or more and 180 dtex or less. The yarn fineness (total fineness) of less than 20 dtex might have an insufficient strength and light-blocking effect while that of more than 180 dtex might make the textile heavier. It is preferable that the yarn fineness (total fineness) is 30 dtex or more and 170 dtex or less. It is preferable that a monofilament constituting the yarn has a fineness of 0.5 dtex or more and 8 dtex or less. It is preferable that a multifilament consists of 6 to 144 pieces of filaments.

To obtain a good light-blocking effect, it is preferable that a woven fabric has a cover factor of 1,300 or more and 2,800 or less. It is preferably 1,500 or more and 2,600 or less.

The cover factor is defined by the following formula.

$$\text{Cover factor of woven fabric} = A \times D_A^{1/2} + B \times D_B^{1/2}$$

A: Warp yarn density of woven fabric [pieces/2.54 cm]
B: Weft yarn density of woven fabric [pieces/2.54 cm]
$D_A$: Warp yarn total fineness [dtex]
$D_B$: Weft yarn total fineness [dtex]

As to knitted fabric, it is preferable that a product of the number of loops in 1 inch (2.54 cm) along the well direction and the number of loops in 1 inch along the course direction is 1,000 or more and 90,000 or less. It is preferably 2,000 or more and 8,000 or less.

When the textile (woven or knitted fabric) has a density less than these densities, such a rough textile might not have a sufficient light-blocking effect. When it has a density more than these densities, the textile tends to be heavier.

It is preferable that a sun-blocking multilayered sheet suitable as a sun-blocking material has a multilayer structure, wherein a bottom face of a synthetic resin film containing carbon black is laminated with a middle layer of a synthetic resin film containing titanium oxide of 10 mass % or more and 70 mass % or less and a top face of a textile. The sun-blocking multilayered sheet has such a top face and a middle layer comprising the textile and the synthetic film containing titanium oxide to achieve a high light-blocking effect as described above. Further, the sun-blocking multilayered sheet has such a bottom face comprising the synthetic resin film containing the carbon black to improve the light-blocking effect and even absorb light reflected on the road or the like, so that the sunlight is blocked from penetrating into the sun-blocking material to the maximum.

It is preferable that a black pigment such as carbon black is added to the synthetic resin film. It is preferable that the black pigment such as carbon black is added by 5 mass % or more and 40 mass % or less. The content of less than 5 mass % might sufficiently achieve neither a sunlight-blocking effect nor an absorbance of the reflected light from the bottom. The excessive black pigment content of more than 40 mass % might cause a poor film formability, a poor quality and a breakage. It is preferable that the content is 8 mass % or more and 30 mass % or less.

Although the thickness of the synthetic resin film containing the carbon black can be adjusted according to each purpose, it is generally preferable that the thickness is 15 to 200 μm, preferably 20 to 150 μm. When it is too thick, the production cost and a whole weight of the sun-blocking multilayered sheet might be heavy. When it is too thin, the light-blocking effect and absorbance of the reflected light might not be achieved sufficiently.

Figure 2:
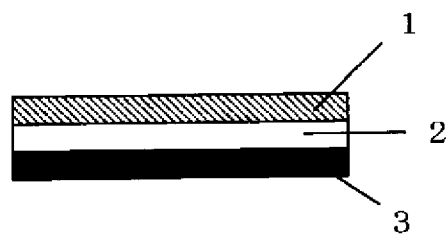
FIG. 2 is a cross section view of a sun-blocking multi-layered sheet according to another example of the present invention.

FIG. 2 is a cross section view of a sun-blocking multilayered sheet according to another example of the present invention. FIG. 2 shows a laminated integrated sun-blocking multilayered sheet consisting of textile 1, synthetic resin film 2 excellent in light-blocking effect containing titanium oxide by 10 mass % to 70 mass % and synthetic film 3 excellent in light-blocking effect containing carbon black.

To manufacture the sun-blocking multilayered sheet suitable for the sun-blocking material, it is possible to employ an ordinary laminating method by which textile 1, titanium oxide-containing synthetic film 2 and carbon black-containing synthetic resin film 3 are integrally laminated with a laminating machine using a polyurethane-based adhesive.

Our sun-blocking multilayered sheet is excellent in light-blocking effect and cooling effect. As to the light-blocking effect, it is preferable that the light-blocking rate is 95% or more and an ultraviolet ray-shielding rate is 95% or more. The light-blocking rate and ultraviolet ray-shielding rate of less than 95% might not achieve a notably sufficient light-blocking effect required. It is preferable that the light-blocking rate is 97% or more and the ultraviolet ray-shielding rate is 97% or more and 100% or less.

As to the cooling effect of the sun-blocking multilayered sheet, it is preferable that the cooling effect is determined to be 31° C. or less, according to so-called reflamp method. When the determined value is more than 31° C., required sufficient cooling effect might not be achieved. It is preferable that the cooling effect is 30° C. or less.

Our sun-blocking multilayered sheet can achieve an excellent light-blocking effect by including the synthetic resin film containing titanium oxide by a high proportion. The sheet includes a textile laminated to reinforce the physical characteristics against breakage. The sheet comprises a woven fabric or knitted fabric containing titanium oxide by a high density to improve the light-blocking effect. Further, the bottom face of the sheet can comprise another synthetic resin film containing carbon black to further block the sunlight and even absorb the light reflected on the road or the like, so that never-achieved excellent light-blocking effect and cooling effect are achieved.

Our sun-blocking multilayered sheet is excellent in sunlight-blocking effect and cooling effect, and is applicable for sun-blocking good such as hand-held parasol, tent, hat, sun-blocking tarp, parasol and stroller hood.

EXAMPLES

Hereinafter, our sun-blocking multilayered sheet will be explained concretely with reference to Examples.

Physical characteristics and performances of the sun-blocking multilayered sheet are measured and evaluated by the following methods.

(1) Cover Factor

The cover factors of woven fabrics are calculated according to the following formulae.

$$\text{Cover factor of textile (woven fabric)} = A \times D_A^{1/2} + B \times D_B^{1/2}$$

A: Warp yarn density of woven fabric [pieces/2.54 cm]
B: Weft yarn density of woven fabric [pieces/2.54 cm]
$D_A$: Warp yarn total fineness [dtex]
$D_B$: Weft yarn total fineness [dtex]

(2) Light-Blocking Rate [%]

The light-blocking rate is determined according to JIS L1055A method (2003 version).

(3) Ultraviolet Ray-Shielding Rate [%]

The ultraviolet ray-shielding rate is determined by the unified evaluation method (Japan Chemical Fibers Association) of processing effect of ultraviolet ray cut material. The transmittance at wavelength 280-400 nm is measured with a spectrophotometer (UV-3600 made by Shimadzu Corporation, Multi-Purpose Large-Sample Compartment MPC-3100 (with Integrating Sphere) as an accessory device) to calculate an integral value to evaluate an ultraviolet ray-cutting effect according to the shielding rate calculated according to the following formula.

$$\text{Shielding rate [\%]} = (1 - \text{transmittance}) \times 100$$

(4) Cooling Effect Determined by Reflamp Method

A sample is held with a spacer on 5 mm of a black drawing paper in a laboratory at temperature of 20+−2° C. A ref lamp (Eye lamp <spot> PRS 100V 500 W, made by Iwasaki Electric Co., Ltd.) irradiates onto the sample from 50 cm above for 15 min to measure surface temperatures on the black drawing paper with a thermal camera (H2630 made by NEC Avio Infrared Technologies Co., Ltd., KAKEN TEST CENTER General Incorporated Foundation). The measurement is performed for four times with different positions of the sample cloth. The measured data is averaged to obtain a test result.

Example 1

A polyester false-twisted textured yarn consisting of 72 filaments of total fineness of 56 dtex was woven into twill and was subject to an ordinary dyeing process in which a jet dyeing at 130° C. and a finishing heat-set process were performed at 160° C. after a scouring process, so that a woven fabric having cover factor of 2,200 was prepared with warp yarn density of 176 [pieces/2.54 cm] and weft yarn density of 118 [pieces/2.54 cm].

Separately, a synthetic resin film is prepared by an ordinary dry production method. Namely, polyurethane resin was melted with volatile solvent such as dimethylformamide to which silica of 0-3 mass % and titanium oxide of 40 mass % are added. A release paper was coated with the melt polyurethane resin and dried at 120° C. to volatilize the solvent to form a polyurethane resin film, which was released from the release paper to prepare a synthetic resin film containing 40 mass % of titanium oxide and having 20 μm of thickness.

Next, the woven fabric and the synthetic resin film were laminated with polyurethane-based adhesive (BURNOCK DN-950 made by DIC Corporation) by a laminating machine to obtain a two-layered sheet consisting of the top face of woven fabric and the bottom face of titanium oxide-containing synthetic resin film.

Thus obtained two-layered sheet was subject to a measurement and an evaluation to find an excellent light-blocking effect and performance such as 97% of light-blocking rate, 97% of ultraviolet ray-shielding rate and cooling effect of 27.9° C.

Example 2

The same woven fabric having cover factor of 2,200 as Example 1 was employed as a textile.

In addition to the same synthetic resin film containing 40 mass % of titanium oxide as Example 1, a dark-colored synthetic resin film of 18 μm thickness containing 30 mass % of carbon black instead of the titanium oxide was employed as another synthetic film.

Next, the same titanium oxide-containing synthetic resin film as Example 1 and the dark-colored carbon black-containing synthetic resin film were laminated by a laminating machine, and these synthetic resin films and the woven fabric textile were further laminated with polyurethane-based adhesive (BURNOCK DN-950 made by DIC Corporation) to obtain a three-layered sheet consisting of the top face of woven fabric, the middle layer of the titanium oxide-containing synthetic resin film and the bottom face of the dark-colored carbon black-containing synthetic resin film.

Thus obtained three-layered sheet was subject to a measurement and an evaluation to find an excellent light-blocking effect and performance such as 100% of light-blocking rate, 99% or more of ultraviolet ray-shielding rate and cooling effect of 25.8° C.

Example 3

A full-dull polyester yarn consisting of 48 filaments of total fineness of 56 dtex was woven into plain fabric and was subject to an ordinary dyeing process in which a jet dyeing at 130° C. and a finishing heat-set process were performed at 160° C. after a scouring process, so that a woven fabric having cover factor of 2,080 was prepared with warp yarn density of 162 [pieces/2.54 cm] and weft yarn density of 116 [pieces/2.54 cm].

Next, the same titanium oxide-containing synthetic resin film as Example 2 and the dark-colored carbon black-containing synthetic resin film were laminated by a laminating machine, and these synthetic resin films and the woven fabric textile were further laminated with polyurethane-based adhesive (BURNOCK DN-950 made by DIC Corporation) to obtain a three-layered sheet consisting of the top face of woven fabric, the middle layer of the titanium oxide-containing synthetic resin film and the bottom face of the dark-colored carbon black-containing synthetic resin film.

Thus obtained three-layered sheet was subject to a measurement and an evaluation to find an excellent light-blocking effect and performance such as 100% of light-blocking rate, 99% or more of ultraviolet ray-shielding rate and cooling effect of 28.5° C.

Comparative Example 1

The same textile as Example 1 and a synthetic resin film containing 7 mass % of titanium oxide were laminated to prepare a two-layered sheet.

Thus obtained two-layered sheet was subject to a measurement and an evaluation to find a poor performance such as 89% of light-blocking rate, 88% or more of ultraviolet ray-shielding rate and cooling effect of 32.1° C.

Comparative Example 2

The same textile as Example 1 and the same synthetic resin film containing 30 mass % of carbon black as Example 2 were laminated to prepare a two-layered sheet.

Thus obtained two-layered sheet was subject to a measurement and an evaluation to find a poor performance such as 94% of light-blocking rate, 93% or more of ultraviolet ray-shielding rate and cooling effect of 31.7° C.

INDUSTRIAL APPLICATIONS OF THE INVENTION

Our sun-blocking multilayered sheet is applicable for sun-blocking good such as hand-held parasol, tent, hat, sun-blocking tarp, parasol and stroller hood.

EXPLANATION OF SYMBOLS

1: textile
2: titanium oxide-containing synthetic resin film
3: carbon black-containing synthetic resin film

The invention claimed is:

1. A sun-blocking multilayered sheet comprising:
a top or outer face textile layer,
a middle synthetic resin film layer that contains titanium oxide in an amount of 10 mass % or more and 70 mass % or less, and
a bottom or inner face synthetic resin film layer that contains carbon black in an amount of 5 mass % or more and 40 mass % or less.

2. The sun-blocking multilayered sheet according to claim 1, wherein the top or outer face textile layer comprises a synthetic fiber containing titanium oxide in an amount of 1 mass % or more and 10 mass % or less.

3. The sun-blocking multilayered sheet according to claim 2, wherein the top or outer face textile layer comprises a woven fabric having 1,300 or more and 2,800 or less of a cover factor defined by a formula as follows:

Cover factor=$A \times D_A^{1/2} + B \times D_B^{1/2}$, where

A: Warp yarn density of woven fabric [pieces/2.54 cm]
B: Weft yarn density of woven fabric [pieces/2.54 cm]
$D_A$: Warp yarn total fineness [dtex]
$D_B$: Weft yarn total fineness [dtex].

4. The sun-blocking multilayered sheet according to claim 1, wherein the top or outer face textile layer comprises a woven fabric having 1,300 or more and 2,800 or less of a cover factor defined by a formula as follows:

Cover factor=$A \times D_A^{1/2} + B \times D_B^{1/2}$, where

A: Warp yarn density of woven fabric [pieces/2.54 cm]
B: Weft yarn density of woven fabric [pieces/2.54 cm]
$D_A$: Warp yarn total fineness [dtex]
$D_B$: Weft yarn total fineness [dtex].

5. A hand-held parasol having a parasol cloth comprising the sun-blocking multilayered sheet according to claim 1.

6. A tent comprising the sun-blocking multilayered sheet according to claim 1.

7. A tarp comprising the sun-blocking multilayered sheet according to claim 1.

8. A hood comprising the sun-blocking multilayered sheet according to claim 1.

9. A hat comprising the sun-blocking multilayered sheet according to claim 1.

10. A parasol comprising the sun-blocking multilayered sheet according to claim 1.

\* \* \* \* \*